United States Patent [19]

Curle

[11] 4,455,790

[45] Jun. 26, 1984

[54] TARPAULIN ANCHORING SYSTEM

[76] Inventor: Pierre W. Curle, R.R. 3, Mattoon, Ill. 61938

[21] Appl. No.: 357,686

[22] Filed: Mar. 12, 1982

[51] Int. Cl.$^3$ .......................... E04D 1/34; E04B 1/347
[52] U.S. Cl. ............................................. 52/4; 52/63; 414/299
[58] Field of Search ...................... 52/4, 3, 157, 5, 745, 52/63, 192; 414/293, 299

[56] References Cited

U.S. PATENT DOCUMENTS

| | | | |
|---|---|---|---|
| 715,603 | 12/1902 | Quarrie et al. | 52/4 |
| 720,611 | 2/1903 | McFarlane | 52/4 |
| 1,187,210 | 6/1916 | Warner | 52/4 |
| 1,225,448 | 5/1917 | Lusardi | 52/157 |
| 1,439,226 | 12/1922 | Clarke | 52/4 |

Primary Examiner—Alfred C. Perham

Attorney, Agent, or Firm—Kinzer, Plyer, Dorn & McEachran

[57] ABSTRACT

A tarpaulin anchoring system for retaining a tarpaulin on a pile of stored grain or other granular material comprises a plurality of anchors embedded in the pile. Each anchor has an attachment element protruding upwardly from the pile, with the attachment element being connected to a fastener affixed to the underside of the tarpaulin. The anchors are placed in the grain pile, throughout the area covered by the tarpaulin, as required to retain it in place. The anchors themselves may be of a screw or auger type which can be driven into an existing grain pile and attached to a tarpaulin as it is spread over the pile. In the case where a tarp is suspended above a grain storage area prior to formation of the grain pile, the anchors may be discs or plates attached to the underside of the tarpaulin by ropes; the anchors are buried in the pile when formed.

5 Claims, 6 Drawing Figures

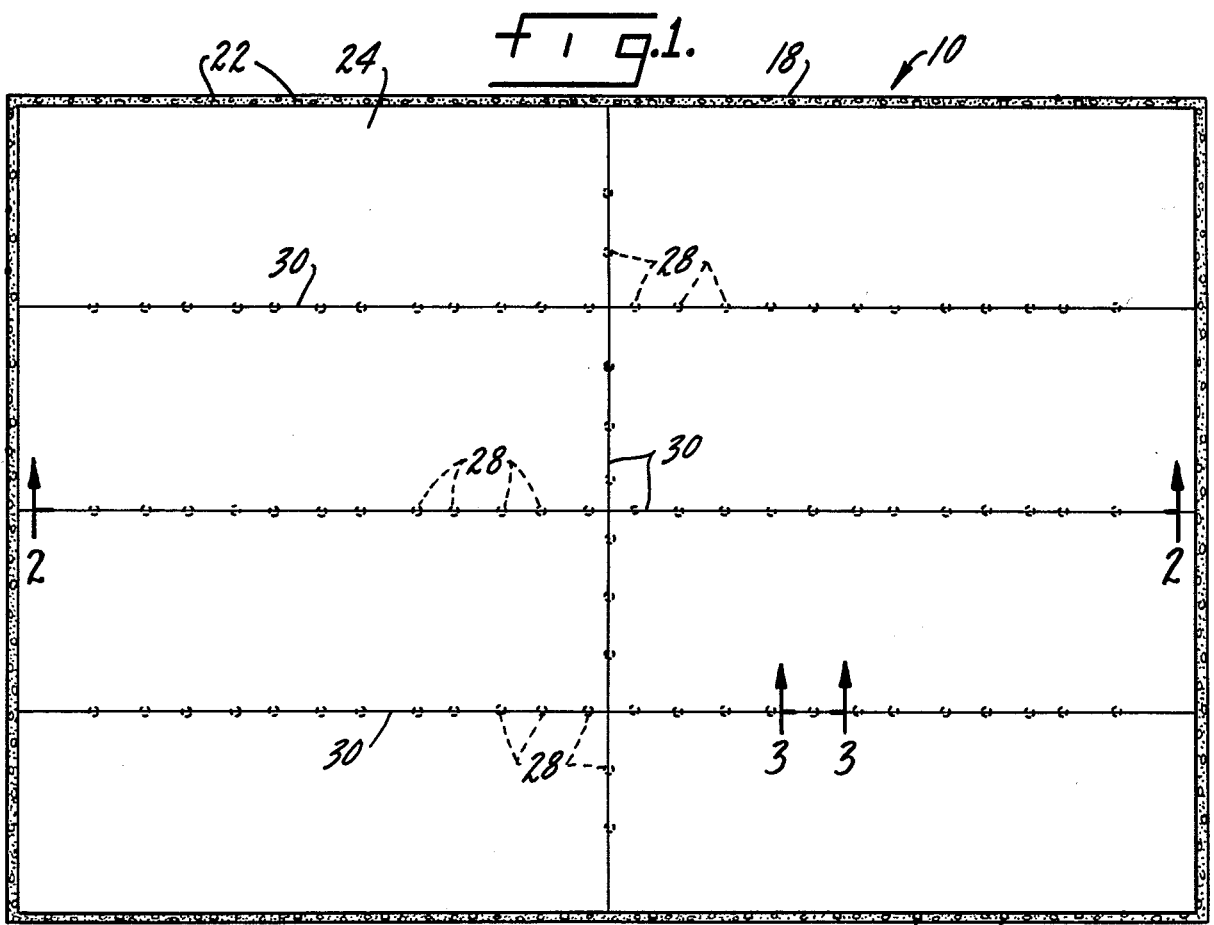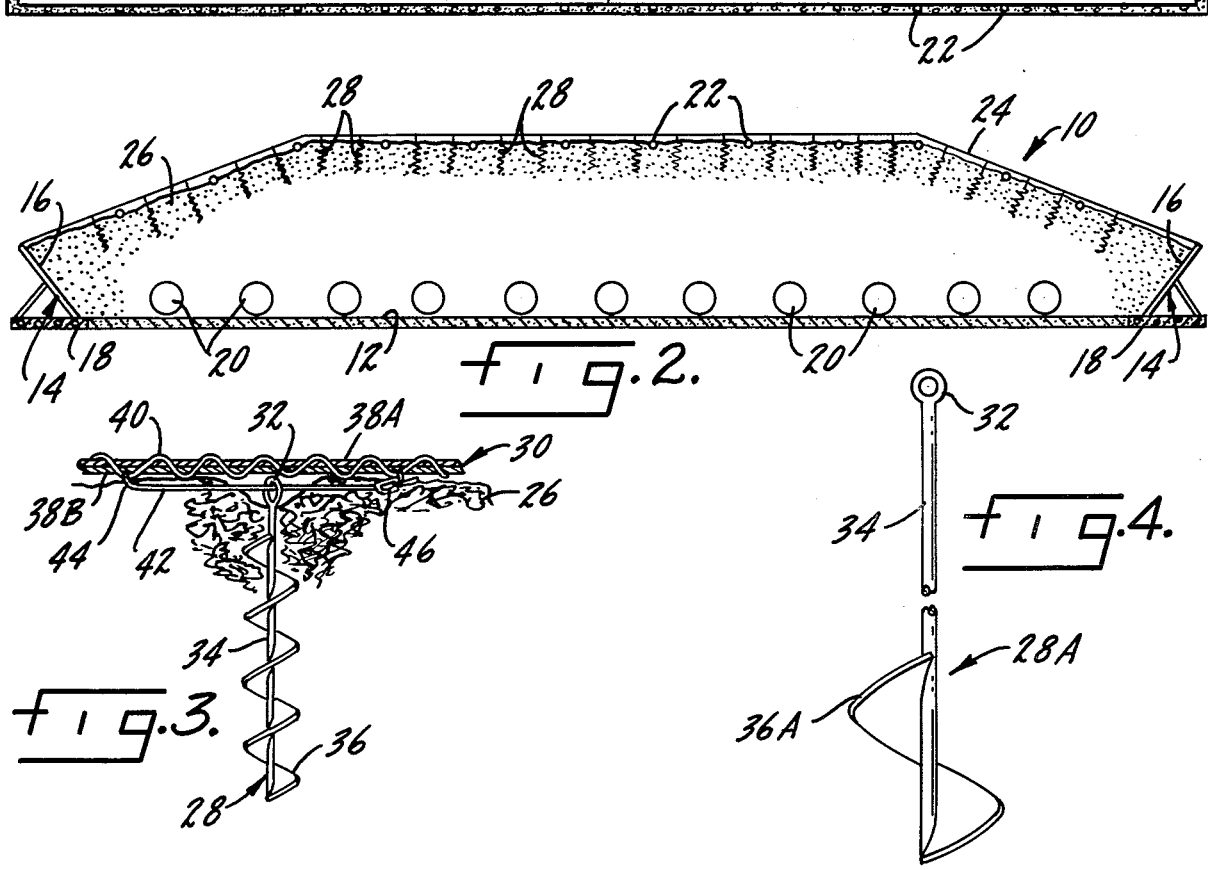

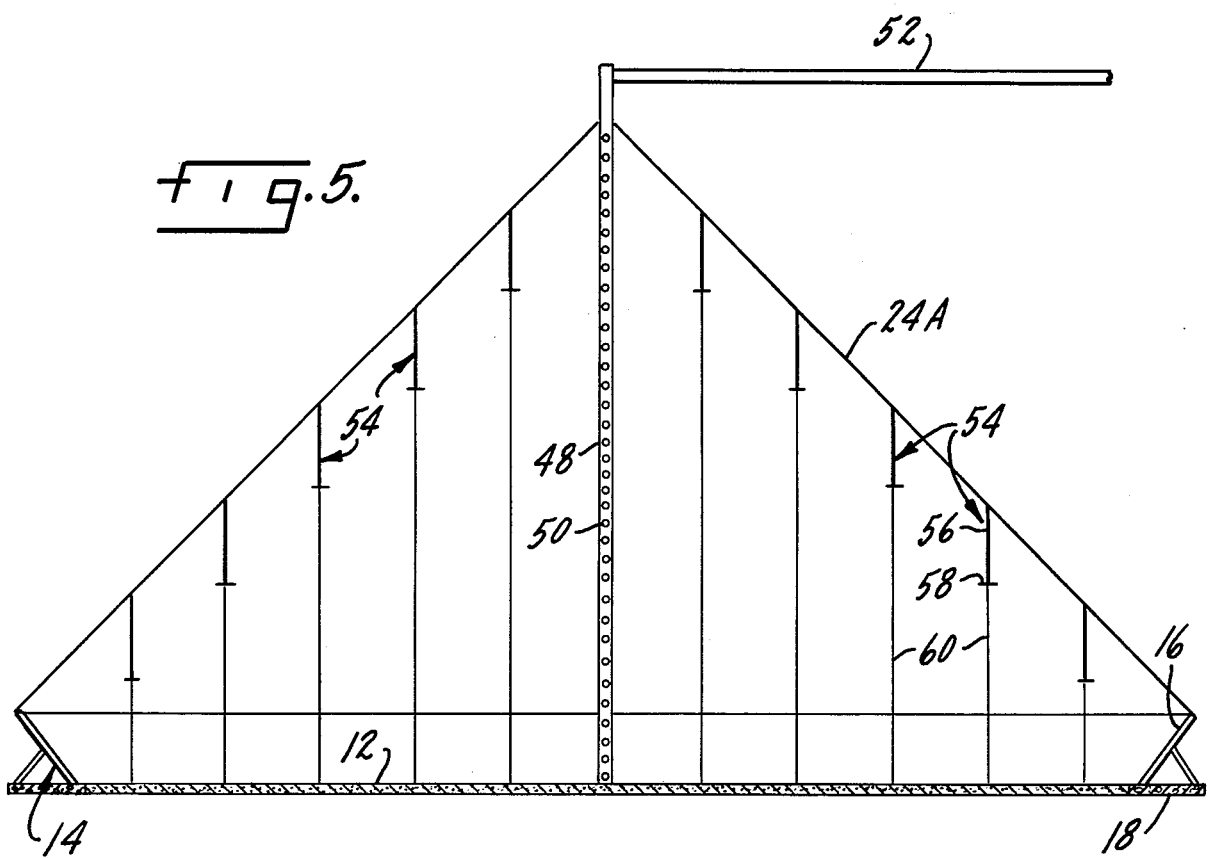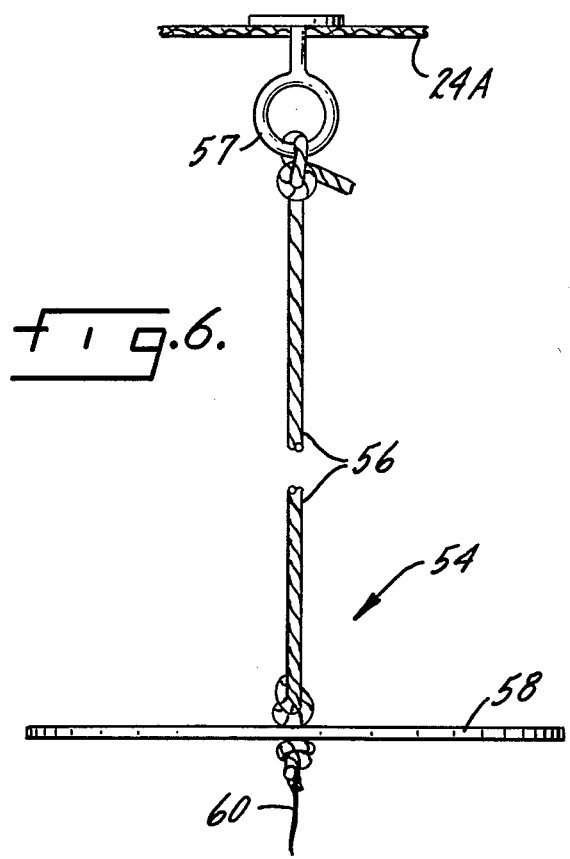

TARPAULIN ANCHORING SYSTEM

BACKGROUND OF THE INVENTION

This invention relates to grain storage and aeration systems. Such systems are now being built which comprise relatively short sidewalls, enclosing a grain storage area either on the ground or a paved slab. Grain is then stored in this structure in a pile. The pile is covered by a weatherproof tarpaulin to protect it from the elements. In some instances the grain storage pile may simply be formed on a suitable surface area with no side walls provided. Similar arrangements are used for storage of other granular materials, including sand, fertilizers, rock salt, and others.

In the past a tarpaulin or like flexible cover has been anchored on a grain pile by a variety of techniques. These included nailing the tarp edges to a wooden nailing strip, lashing the tarpaulin down with a network of cables or ropes, and placing weights such as old tires on top of the tarpaulin. The tires themselves are sometimes connected together with a network of ropes, wires, or cables. Some of these methods are fairly effective, but they require a great deal of materials and labor to cover and uncover the grain pile.

SUMMARY OF THE INVENTION

An object of the present invention is to provide an anchoring system for a tarpaulin cover for a pile of grain or other granular material which is economically constructed and simple and effective in use.

Another object is to provide a tarpaulin anchoring system which can be put in place either before or after a grain pile has been formed.

Another object is to provide a tarpaulin anchoring system which will work equally well with a pre-fabricated tarpaulin or a tarp that is assembled on top of the grain pile.

Accordingly, the invention is directed to an anchoring system for securing a tarpaulin or like flexible cover in covering relation on a pile of grain or other granular material. The system includes a plurality of anchors, each embedded at a substantial depth in the grain pile. Each anchor has an attachment element extending upwardly from the top of the pile. A plurality of fasteners are affixed to the underside of the tarpaulin and each fastener is connected to an attachment element of one of the anchors to secure the tarpaulin in place. Each anchor is held in position in the pile by the weight of the granular material above the anchor.

BRIEF DESCRIPTION OF THE DRAWINGS

FIG. 1 is a plan view of a grain storage structure incorporating a tarpaulin anchoring system in accordance with one embodiment of the invention.

FIG. 2 is a schematic sectional elevation view of the grain storage structure of FIG. 1, taken approximately as indicated by line 2—2 of FIG. 1.

FIG. 3 is an enlarged detail section view taken approximately along line 3—3 of FIG. 1.

FIG. 4 is an elevation view, on an enlarged scale, of an anchor according to another embodiment of the invention.

FIG. 5 is a schematic sectional elevation view of a grain storage structure having a tarp supported by a central leg and incorporating a further embodiment of the anchoring system of the present invention.

FIG. 6 is an enlarged detail view showing an anchor used in the system of FIG. 5.

DESCRIPTION OF A PREFERRED EMBODIMENT

A grain storage and aeration system 10 for protecting a mass of stored grain or other granular commodity is generally illustrated in FIGS. 1 and 2. The storage system 10 includes a floor 12 (FIG. 2) which is preferably paved with asphalt or concrete; however, the floor 12 could simply be bare, packed earth. A series of support trusses 14 are mounted at spaced locations around the periphery of the floor 12. Perforated sheet metal sidewalls 16 are supported on the trusses 14. The sidewalls enclose a grain storage area on the floor 12 which accommodates a mass of stored grain or other granular commodity. The sidewall support trusses 14 are anchored to a concrete pad 18 which extends around the periphery of the grain storage area. While FIG. 1 illustrates a rectangular storage system 10, it should be understood that other shapes may be used.

FIG. 2 illustrates a forced aeration system which provides airflow through a grain mass 26 stored in the system 10. A first set of perforated aeration ducts 20 extend across the floor 12. These ducts extend through the sidewalls 16 and are connected to exhaust fans (not shown) outside of the sidewalls. After the storage system 10 has been filled with grain, a set of light-weight perforated plastic aeration ducts 22 is laid across the top of the grain. These upper aeration ducts extend slightly beyond the upper edges of the sidewalls 16 (see FIG. 1) so that the ends of the ducts are exposed to air outside of the storage structure.

After the upper aeration ducts 22 are put in place, a heavy-duty, flexible weatherproof cover, such as a tarpaulin 24, is installed over the top of the grain and over the upper aeration ducts 22. Once the tarpaulin is securely in place, the exhaust fans may be turned on. Air is then pulled in through the perforated sidewalls 16 and the upper aeration ducts 22. The air moves downwardly through the grain under the tarp and out through the ducts 20 to aerate the entire grain mass. Further details of the grain storage system 10 and its aeration system are shown and described in the co-pending application of John Aldag, Ser. No. 353,184, filed on Mar. 1, 1982.

The grain pile 26 is shown in FIGS. 2 and 3. A plurality of anchors 28 embedded in the grain pile 26 hold the tarpaulin 24 in place. The anchors 28 are placed in the grain pile throughout the area covered by the tarpaulin 24, as required to retain it. In the preferred arrangement shown in FIG. 1, the anchors 28 are located at intervals along the seams of the tarpaulin. The tarpaulin may be brought to the storage site in sections which are then laced together as they are spread on the completed grain pile. The seams of the tarp sections are shown at 30. The anchors 28 are driven into the grain pile along the locations of the seams. As each seam is laced together the tarp is connected to the anchors, either by separate fastening means or by lacing the anchor into the seam itself.

Details of a seam and an anchor are shown in FIG. 3. Each anchor 28 has an attachment element which protrudes from the grain pile 26. As shown, the attachment element comprises a ring 32 attached to the top of a shaft 34. A spiral blade 36 is attached to the shaft 34. Thus, the anchor 28 is essentially in the form of an auger. The spiral blade 36 preferably extends to the lower end of the shaft 34 so that when the anchor is embedded in the grain pile 26 the maximum weight of grain will bear on the spiral blade 36. It may be most economical to use standard, off-the-shelf conveyor augers as the anchors 28, with an attachment ring mounted on one end of each auger shaft. Also in this regard, the attachment element 32 may have a form other than the ring shown. For example, it could be a hook with a spring-loaded retainer.

FIG. 4 shows an alternate form 28A of the auger-type anchor. Here there is only one flight 36A of the spiral blade. It is located at the bottom of shaft 34.

The attachment elements on the anchors cooperate with a plurality of fasteners affixed to the underside of the tarpaulin 24. FIG. 3 illustrates a typical fastener. The seam 30 of the tarpaulin includes layers 38A and 38B which are laced together by cord 40. A tie-down strap 42 is stitched at one end 44 to the underside of the tarpaulin layer 38B. A buckle 46 is also stitched into the underside of the tarpaulin. When it is desired to attach the tarpaulin to an anchor 28 (the anchor first having been screwed into the grain pile) the strap 42 is threaded through the attachment element 32 of the anchor 28 and then the strap is threaded into the buckle 46 so that the strap 42 forms a closed loop on the underside of the tarpaulin.

It will be understood that other arrangements could be used for fastening the tarpaulin to the anchors. For example, the tie-down strap 42 could be formed in two pieces, each sewn to the tarp, with an intermediate buckle connecting the two pieces after they are threaded through the anchors. Or the fasteners and attachment combination could be a hook and eye arrangement, perhaps with a spring-loaded retainer. In any event, the anchors are embedded in the grain and the tarpaulin is attached to the anchors at the time of placing the tarp on the grain pile.

Removal of the tarpaulin and anchors from the grain storage system 10 is simple and expedient. The tarp seams 30 are unlaced and the straps 42 are unbuckled or otherwise released to separate the tarpaulin from the anchors 28. The anchors 28 are readily removed by simply unscrewing them from the grain pile 26. Thus, both the tarpaulin 24 and the anchors 28 are rapidly and conveniently removable from the grain pile.

The tarpaulin anchoring technique described in connection with FIGS. 1-4 is not confined to use with a sidewall structure and aeration apparatus as incorporated in the complete storage system 10. Rather, it can be applied to virtually any tarpaulin as spread over or assembled on a previously formed pile of grain or other granular material of any desired configuration. In some instances it may be desirable to supplement the auger anchors 28 with spaced tie down loops or the like around the periphery of the tarpaulin 24 to limit the entry of air beneath the tarp for strong wind conditions. Any desired form of supplemental peripheral tie down arrangement can be employed. For an unwalled grain pile on an earth base, simple loops and stakes will do.

The anchors 28 afford appreciable advantages as compared with conventional tarpaulin anchoring techniques.

There is no external cabling, weights, or other apparatus to be dragged across the tarpaulin or that could shift on the tarp surface in adverse weather, with possible resultant damage to the tarpaulin. The anchors hold the tarp 24 firmly against the surface of the grain pile even under extreme windy conditions; the anchors 28 cannot be moved by the wind because they are not exposed to it. The auger anchors are quickly inserted and equally quickly removed from the grain pile by simply screwing them in or out. Nevertheless, they provide firm anchorage, capable of withstanding high winds and other adverse weather conditions.

The anchoring system of FIGS. 1-4 is primarily suitable for use when a tarpaulin is applied to a completed grain pile. There are instances, however, where it is desirable to place the tarp over a grain storage structure prior to filling it. In such "tarp-first" systems, an alternate arrangement for the anchoring system is required. This arrangement is shown in FIGS. 5 and 6. The grain storage system has many of the same components as the system described above. There is a floor 12, support trusses 14, and sidewalls 16. Aeration ducts, though not shown in FIG. 5, may be provided.

In addition to these common parts, the "tarp-first" system has a center leg 48. The center leg is a hollow post having a series of large openings 50 therein. Grain is fed through a conveyor 52 to the top of the center leg 48. From there it moves down through the center leg and out the openings 50 of leg 48 to fill the grain storage area. The tarpaulin 24A is supported at the center by the leg 48. The edges of the tarpaulin are fastened to the sidewalls 16.

Since the tarp 24A is raised on the center leg 48 before the grain pile is formed, it is not usually practical to reopen the tarp to install the auger-type anchors 28 after the grain pile is formed. Instead, this embodiment of the invention provides for placement of an alternate type of anchor prior to formation of the grain pile. These anchors 54 are spaced throughout the area of the tarp. Each anchor 54 includes a flexible cable or rope 56 having one end secured to a fastener 57 on the underside of the tarpaulin 24. In a preferred embodiment the member 56 is made of nylon rope. A flat disc 58 is attached to the lower end of the line by suitable means. The disc 58 can be made of rigid plastic or wood or other lightweight material. A stay line 60 is connected from each disc 58 to the floor 12. Light twine can be used for the stay lines. The purpose of the stay lines is to prevent the anchors 54 from being displaced during filling of the grain storage area. When the grain storage area is filled the anchors 54 are embedded in the grain with sufficient weight of grain above the discs 58 to hold them in place, thereby securing the tarpaulin by means of the lines 56.

By calculating the volume of the commodity resting on a disc (or on the lowest flight of an auger) and multiplying by the density of the commodity, one can determine the anchoring capability of the commodity. By way of example, if corn is being stored, an eight inch diameter disc 58 on a six foot long line 56 is effectively anchored by approximately 94 pounds of corn. A ten inch disc on a four foot line is anchored by about 98 pounds of corn. A twelve inch disc on a four foot line is anchored by some 141 pounds of corn.

While preferred forms of the invention have been shown and described, it will be understood that modifications of the anchoring systems shown can be made. For example, it would be possible to have auger-type anchors attached to the tarp with their shafts accessible for rotation from the outside of the tarp. This would require a sealable opening in the tarp. And in such a case it may be preferable to have a flight of a spiral blade that moves up and down on a rotating shaft while the shaft itself remains stationary in a vertical direction. Such an arrangement would be suitable for use in a system where grain is frequently added to or taken away from the storage structure, since the augers could readily be engaged and disengaged from the grain pile.

I claim:

1. An anchoring system for securing a tarpaulin or like flexible cover in covering relation on a pile of grain or other granular material, comprising a plurality of anchors each embedded at a substantial depth in the grain pile, the anchors being spaced throughout the area covered by the tarpaulin, each anchor having an attachment element extending upwardly from the top of the pile, and a plurality of fasteners affixed to the underside of the tarpaulin, each fastener being connected to an attachment element of one of the anchors to secure the tarpaulin in place, each anchor being held in position in the pile by the weight of the granular material above the anchor.

2. The tarpaulin anchoring system of claim 1 in which each anchor comprises a shaft, the attachment element being mounted on one end of the shaft, the anchor further comprising at least one flight of a spiral blade attached to the shaft adjacent the other end.

3. The tarpaulin anchoring system of claim 1 or 2 further comprising auxiliary means for holding down the edges of the tarpaulin.

4. The tarpaulin anchoring system of claim 1, further comprising a center leg which supports the tarpaulin prior to formation of the pile of granular material, in which the attachment element of each anchor comprises a flexible line hanging from a fastener on the tarpaulin, and a disc attached to the lower end of the line such that upon formation of the pile the disc is buried in the granular material.

5. The tarpaulin anchoring system of claim 4, further comprising stay lines connecting the discs to the floor on which the pile of granular material is formed to prevent displacement of the anchor during formation of the pile.

* * * * *